(12) United States Patent
Hirooka et al.

(10) Patent No.: US 9,602,737 B2
(45) Date of Patent: Mar. 21, 2017

(54) IMAGING APPARATUS

(71) Applicant: Hitachi Industry & Control Solutions, Ltd., Hitachi-shi, Ibaraki (JP)

(72) Inventors: Shinichiro Hirooka, Tokyo (JP); Hirotomo Sai, Tokyo (JP); Junji Shiokawa, Tokyo (JP)

(73) Assignee: Hitachi Industry & Control Solutions, Ltd., Hitachi-shi (JP)

( * ) Notice: Subject to any disclaimer, the term of this patent is extended or adjusted under 35 U.S.C. 154(b) by 34 days.

(21) Appl. No.: 14/597,872

(22) Filed: Jan. 15, 2015

(65) Prior Publication Data

US 2015/0222800 A1 Aug. 6, 2015

(30) Foreign Application Priority Data

Jan. 31, 2014 (JP) ................................ 2014-016353

(51) Int. Cl.
    *H04N 5/235* (2006.01)
(52) U.S. Cl.
    CPC ......... *H04N 5/2353* (2013.01); *H04N 5/2351* (2013.01)
(58) Field of Classification Search
    CPC .. H04N 5/2353; H04N 5/2351; H04N 5/2352; H04N 5/238; H04N 5/235; H04N 5/243; H04N 1/6027; H04N 1/6058; H04N 9/045; G06T 5/001; G06T 11/001; G06T 7/408

See application file for complete search history.

(56) References Cited

U.S. PATENT DOCUMENTS

| | | | |
|---|---|---|---|
| 6,583,820 B1* | 6/2003 | Hung | H04N 5/2351 348/362 |
| 8,208,039 B2* | 6/2012 | Manabe | G06T 5/009 348/229.1 |
| 8,681,242 B2* | 3/2014 | Ohbuchi | H04N 5/243 348/222.1 |
| 9,350,905 B2* | 5/2016 | Hirooka | G06T 5/008 |
| 2004/0041928 A1 | 3/2004 | Hirakoso et al. | |
| 2005/0190272 A1* | 9/2005 | Takahashi | H04N 5/243 348/222.1 |
| 2015/0172618 A1* | 6/2015 | Takahashi | H04N 5/33 348/164 |

FOREIGN PATENT DOCUMENTS

| | | |
|---|---|---|
| JP | 2008-131530 A | 6/2008 |
| JP | 2012-205031 A | 10/2012 |

* cited by examiner

*Primary Examiner* — Luong T Nguyen
(74) *Attorney, Agent, or Firm* — Crowell & Moring LLP

(57) ABSTRACT

An imaging apparatus includes an imaging unit; an image signal correcting unit that executes a signal level correction process on an image signal output by the imaging unit and outputs the level corrected image signal; and a gradation collapse suppression control unit that evaluates a degree of gradation collapse of a predetermined brightness range in the image signal output by the imaging unit and switches control of an exposure amount of the imaging unit and an input/output characteristic of the signal level correction process of the image signal correcting unit, when it is determined that the gradation collapse exists according to an evaluation result and when it is determined that the gradation collapse does not exist according to the evaluation result.

9 Claims, 15 Drawing Sheets

FIG. 2B
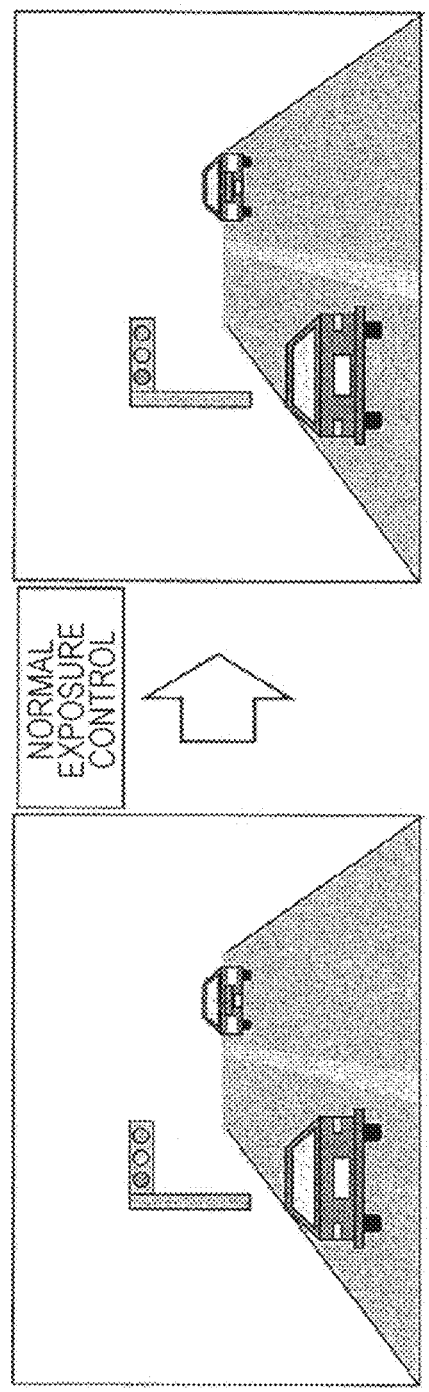
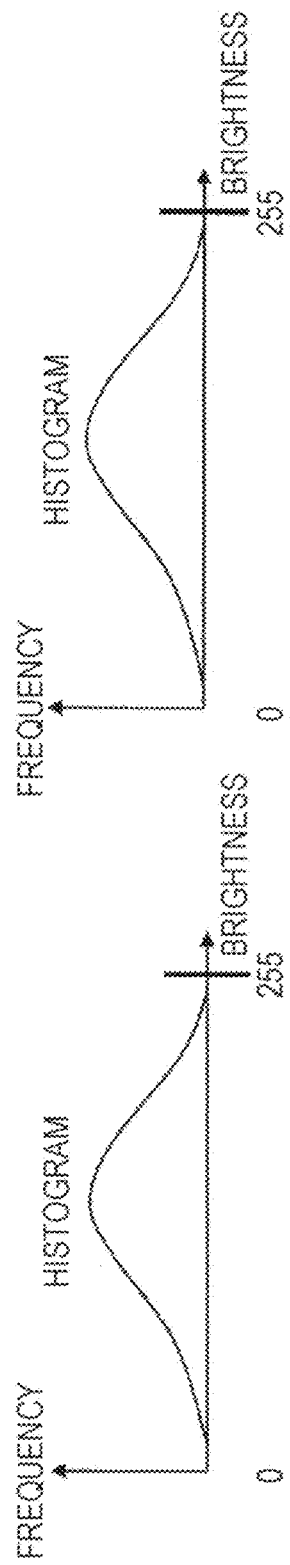

FIG. 2C
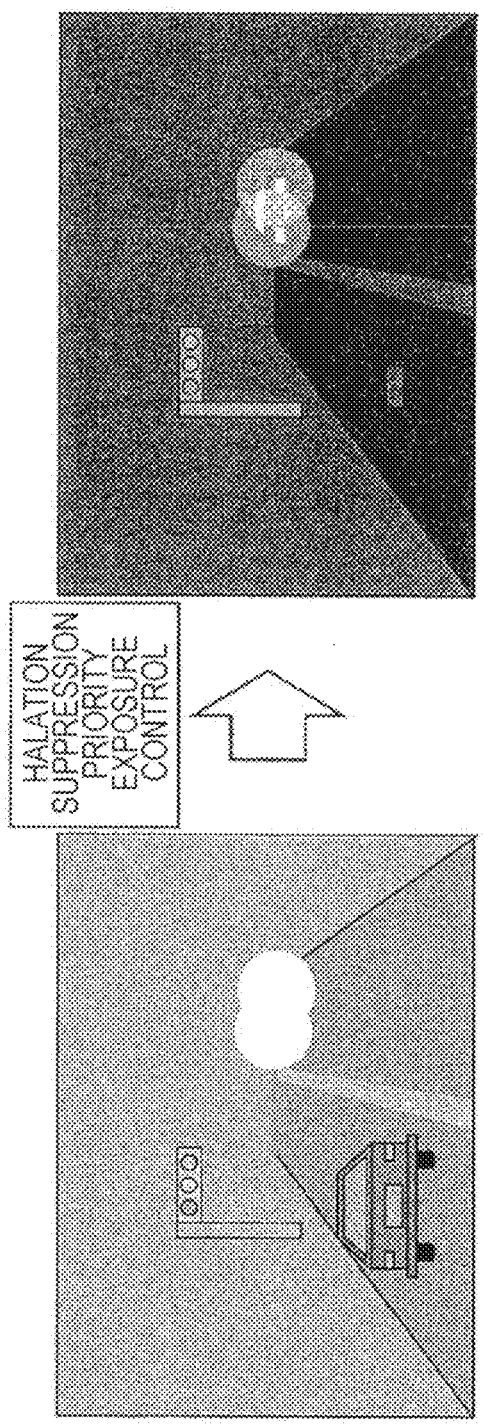
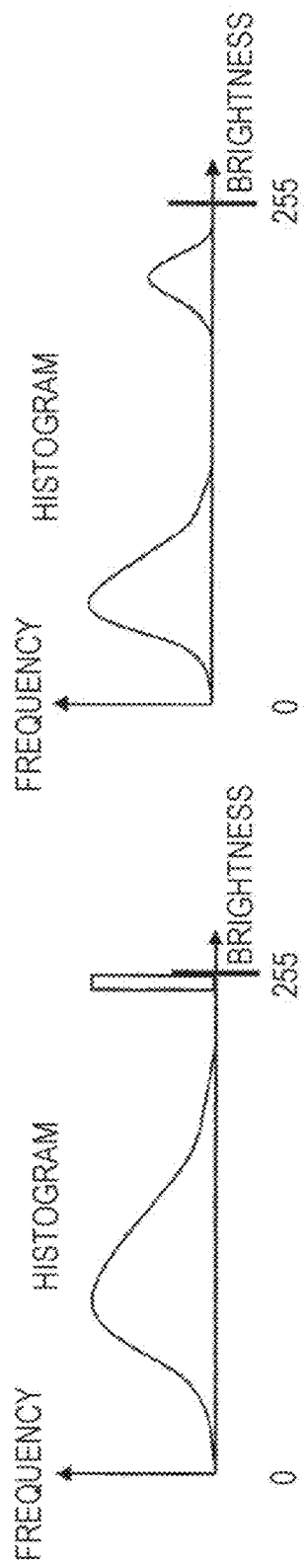

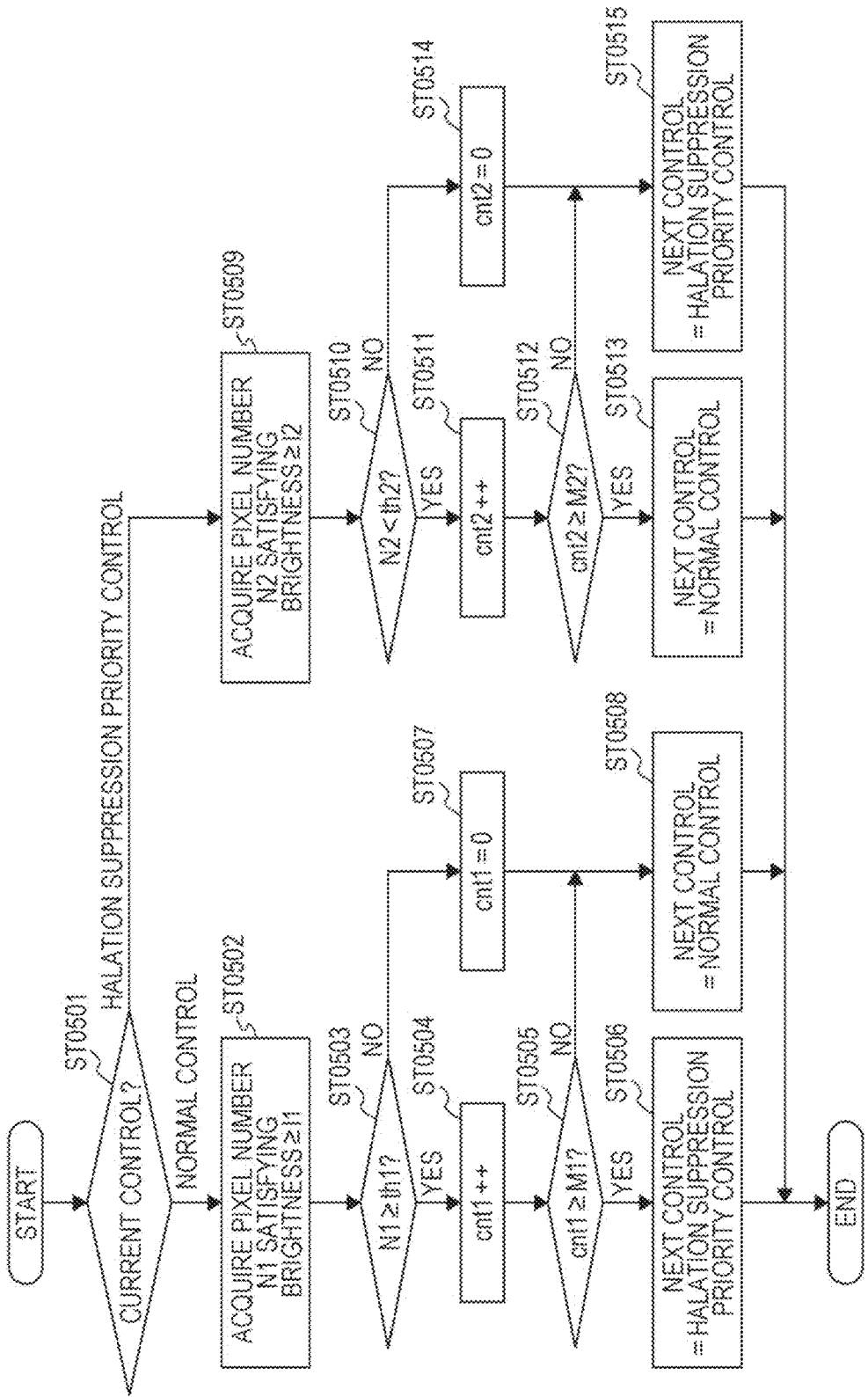

FIG. 6A
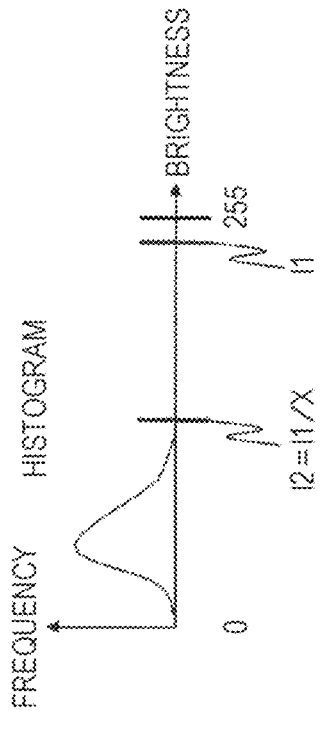
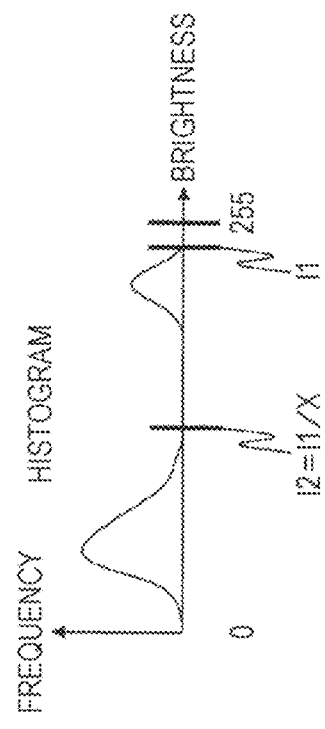
FIG. 6B
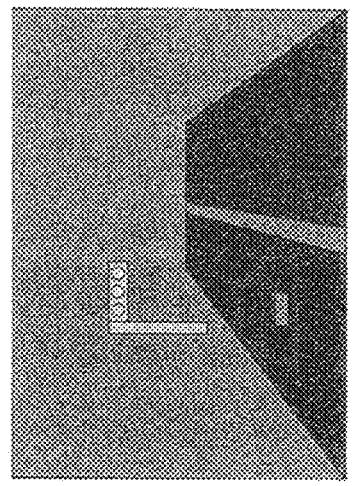
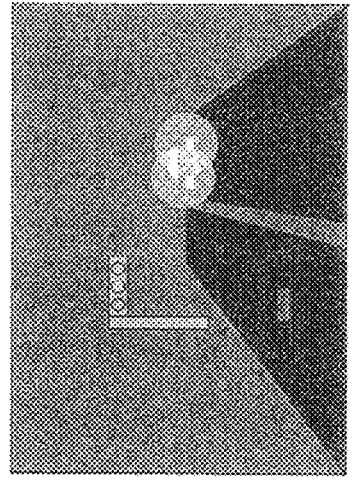

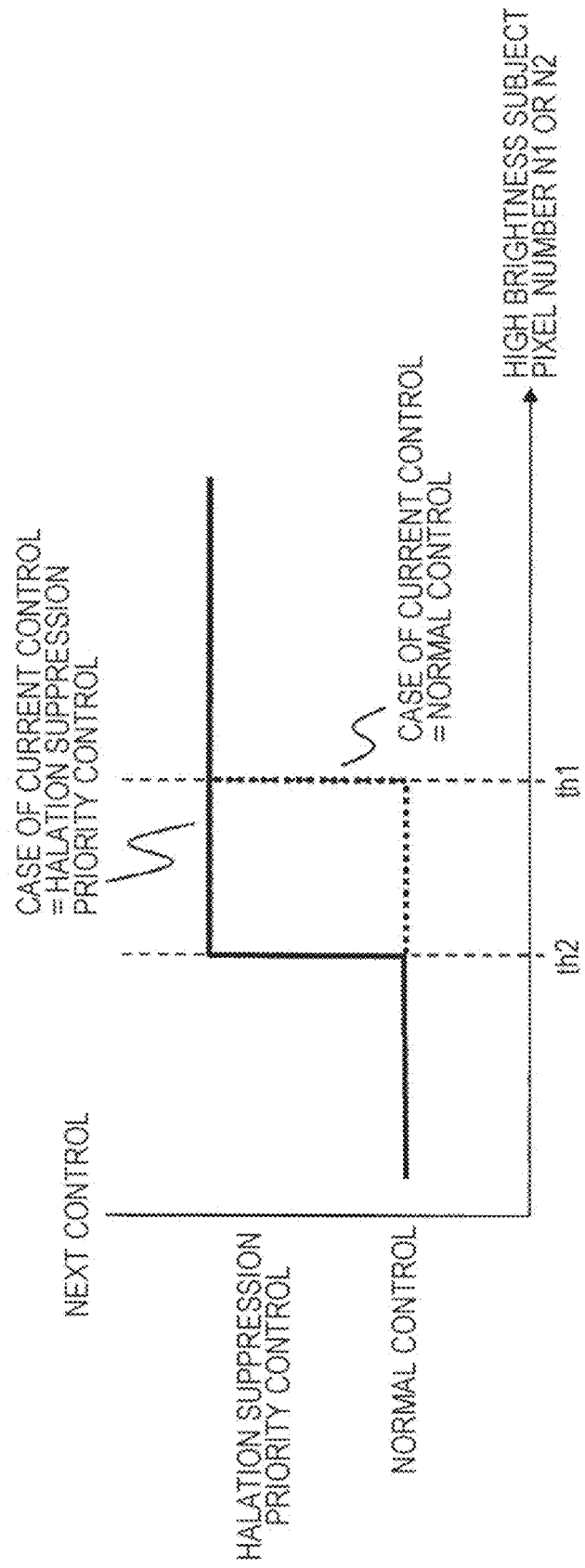

FIG. 9B
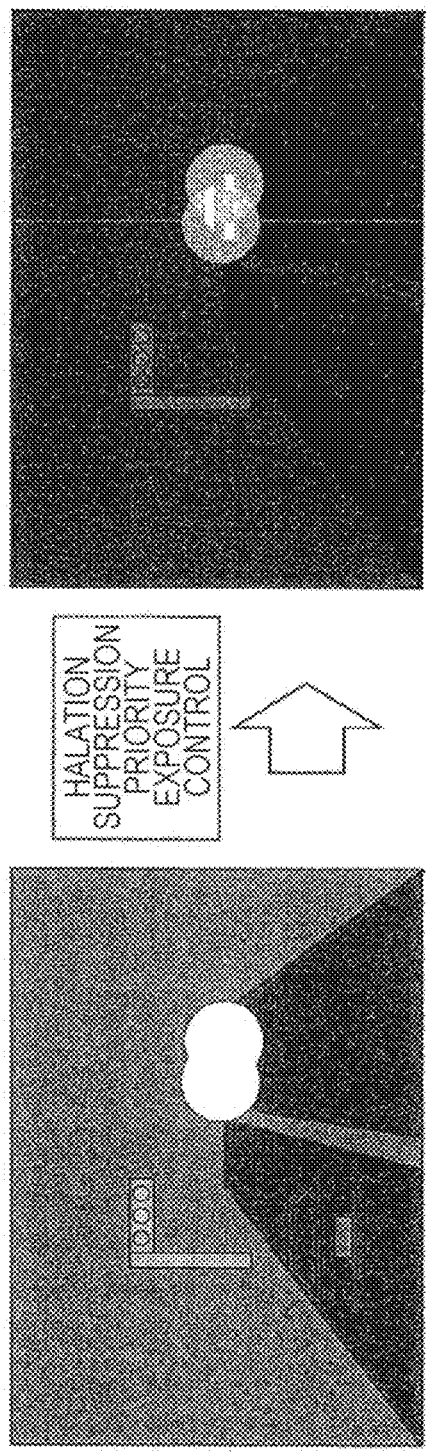
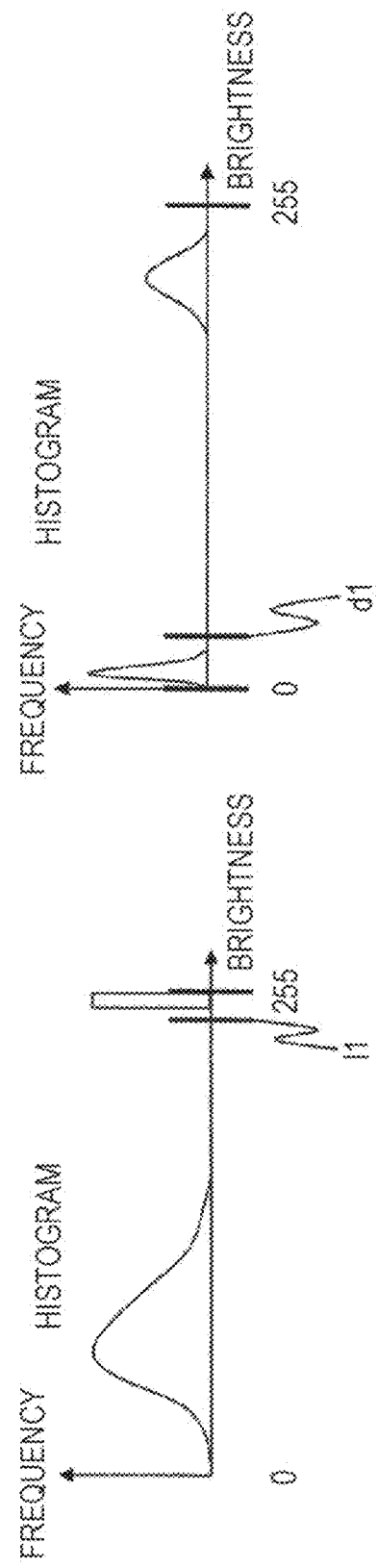

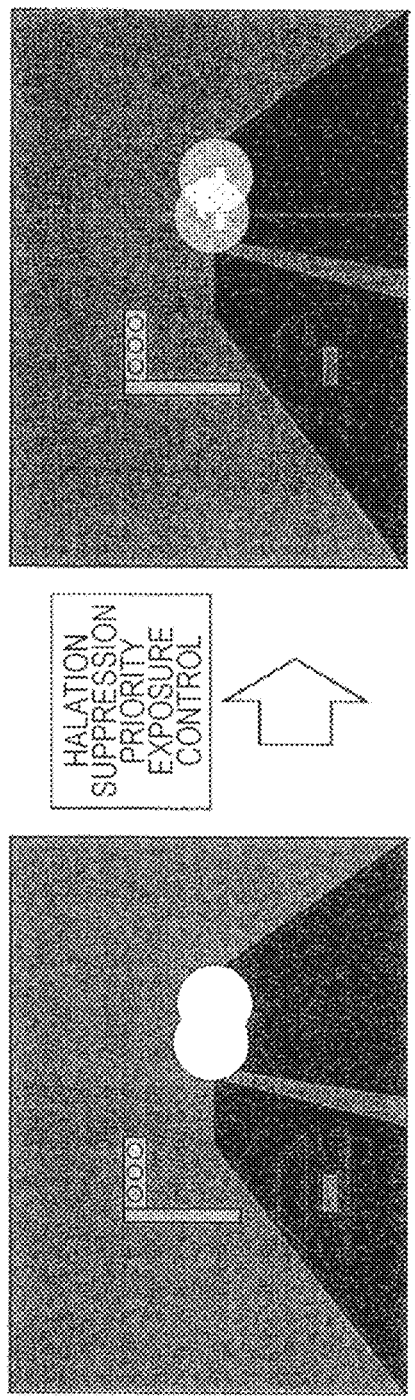
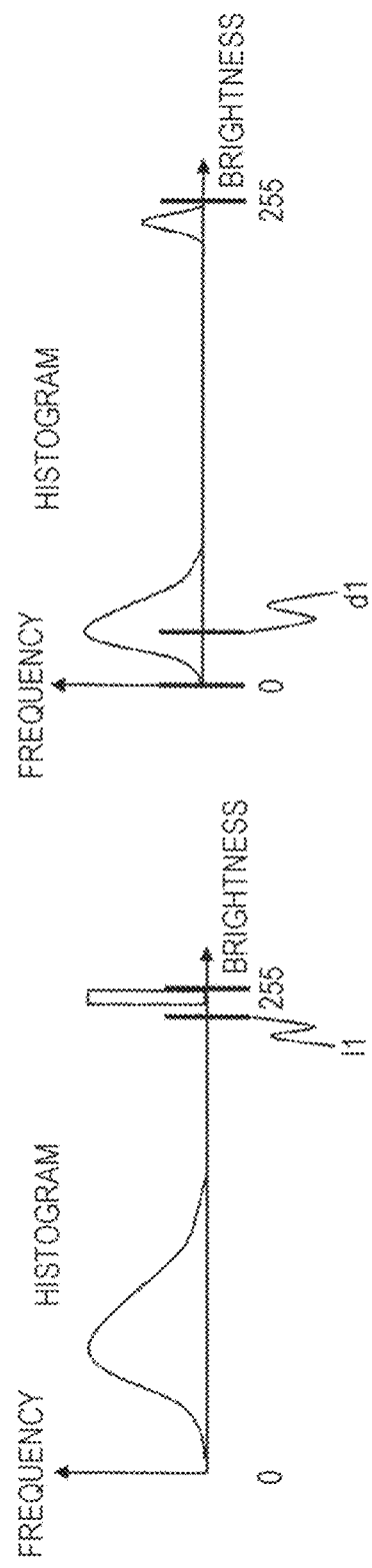
FIG. 9C

FIG. 10B
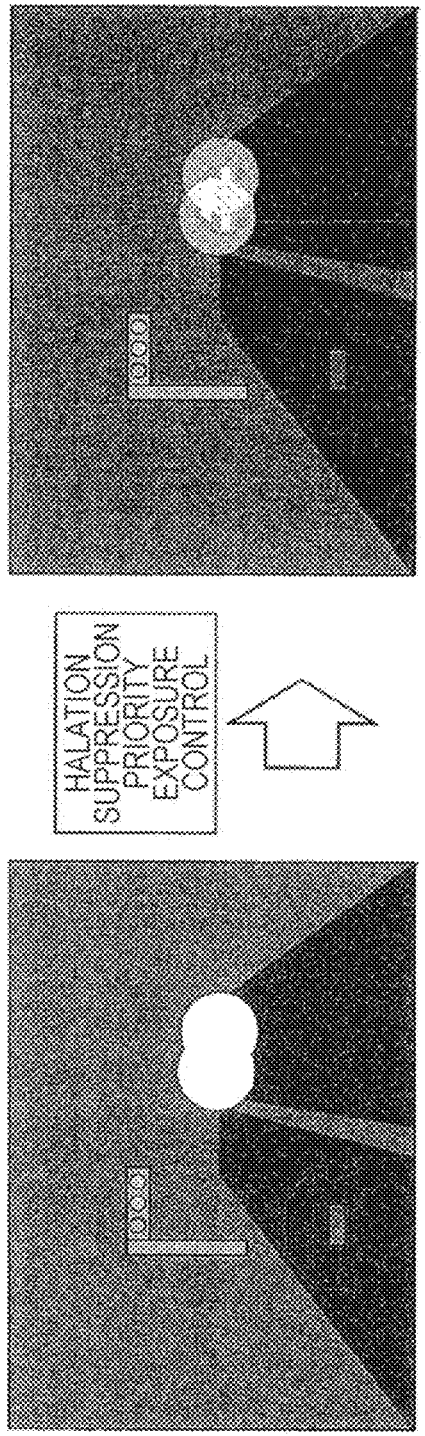
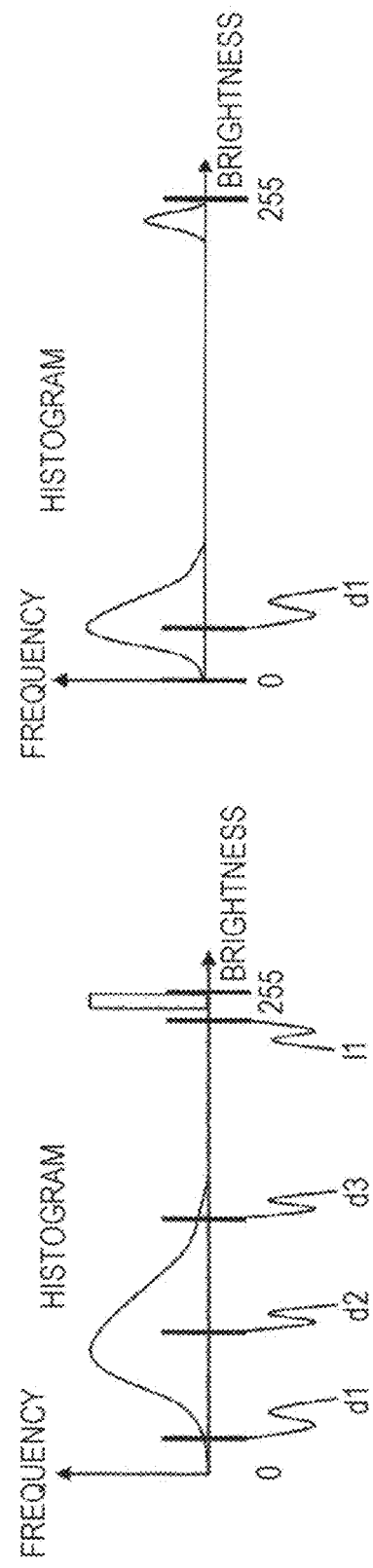

IMAGING APPARATUS

CROSS-REFERENCE TO RELATED APPLICATIONS

This application claims the priority of Japanese Patent Application No. 2014-016353, filed on Jan. 31, 2014, which is incorporated herein by reference in its entirety.

BACKGROUND OF THE INVENTION

1. Field of the Invention

The present invention relates to an imaging apparatus and more particularly, to an imaging apparatus that performs exposure control to change a signal level, such as backlight correction and black saturation correction, and various image corrections.

2. Description of the Related Art

As the related art of the present technology, JP-2008-131530-A has been known, for example. In JP-2008-131530-A, an object thereof is to "provide an imaging apparatus and an image processing apparatus that have a simple configuration to execute gradation correction according to a subject brightness level of an image". In addition, in JP-2008-131530-A, technology "in a configuration to perform correction of an image imaged by exposure control to adjust a brightness level of a main subject in the imaging apparatus, data corresponding to subject brightness of the imaging image is selected from gradation correction characteristic data of the limited number corresponding to brightness and the gradation correction is performed. Specifically, a correction process is executed by applying a gradation correction characteristic set to correspond to a region in which average brightness of the main subject of the imaging image is included. By this configuration, the correction process can be executed quickly and efficiently without increasing a circuit scale of a digital signal processing unit (DSP) in the imaging apparatus." has been disclosed.

SUMMARY OF THE INVENTION

In JP-2008-131530-A, exposure control to improve halation of video is executed by feedback control, it cannot correspond to the case in which a high brightness subject moves in a viewing angle and out of the viewing angle at a high speed, the halation cannot be improved, and visibility may be deteriorated or image quality may be deteriorated by overcorrection.

To achieve the above object, configurations described in claims are adopted.

The present application includes a plurality of means for achieving the above object, and examples thereof include an imaging apparatus including an imaging unit; an image signal correcting unit that executes a signal level correction process on an image signal output by the imaging unit and outputs the level corrected image signal; and a gradation collapse suppression control unit that evaluates a degree of gradation collapse of a predetermined brightness range in the image signal output by the imaging unit and switches control of an exposure amount of the imaging unit and an input/output characteristic of the signal level correction process of the image signal correcting unit, when it is determined that the gradation collapse exists according to an evaluation result and when it is determined that the gradation collapse does not exist according to the evaluation result.

The present invention can provide video obtained by appropriately improving visibility and image quality according to whether a high brightness subject exists or not, stably with high responsiveness to a subject variation.

BRIEF DESCRIPTION OF THE DRAWINGS

FIG. 2B is a diagram illustrating an example of an operation of the exposure control of the imaging apparatus according to the first embodiment of the present invention in the case in which a high brightness subject having halation does not exist in a viewing angle;

FIG. 2C is a diagram illustrating an example of an operation of the exposure control of the imaging apparatus according to the first embodiment of the present invention in the case in which a high brightness subject having halation exists in a viewing angle;

FIG. 5 is a diagram illustrating an example of a process sequence regarding a control switching process of the imaging apparatus according to the first embodiment of the present invention;

FIGS. 6A and 6B are diagrams illustrating an example of a method of determining a brightness threshold value 12 in a control switching process of the imaging apparatus according to the first embodiment of the present invention;

FIG. 8 is a diagram illustrating an example of a method of determining a high brightness subject determination threshold value th2 in a control switching process of the imaging apparatus according to the first embodiment of the present invention;

FIG. 9B is a diagram illustrating an example of an operation in the case in which the exposure control of the imaging apparatus according to the first embodiment of the present invention is applied;

FIG. 9C is a diagram illustrating an example of an operation in the case in which the first example of the exposure control of the imaging apparatus according to the second embodiment of the present invention is applied;

FIG. 10B is a diagram illustrating an example of an operation in the case in which the second example of the exposure control of the imaging apparatus according to the second embodiment of the present invention is applied.

DESCRIPTION OF THE PREFERRED EMBODIMENTS

Hereinafter, embodiments of the present invention will be described using the drawings.

First Embodiment

Figure 1:
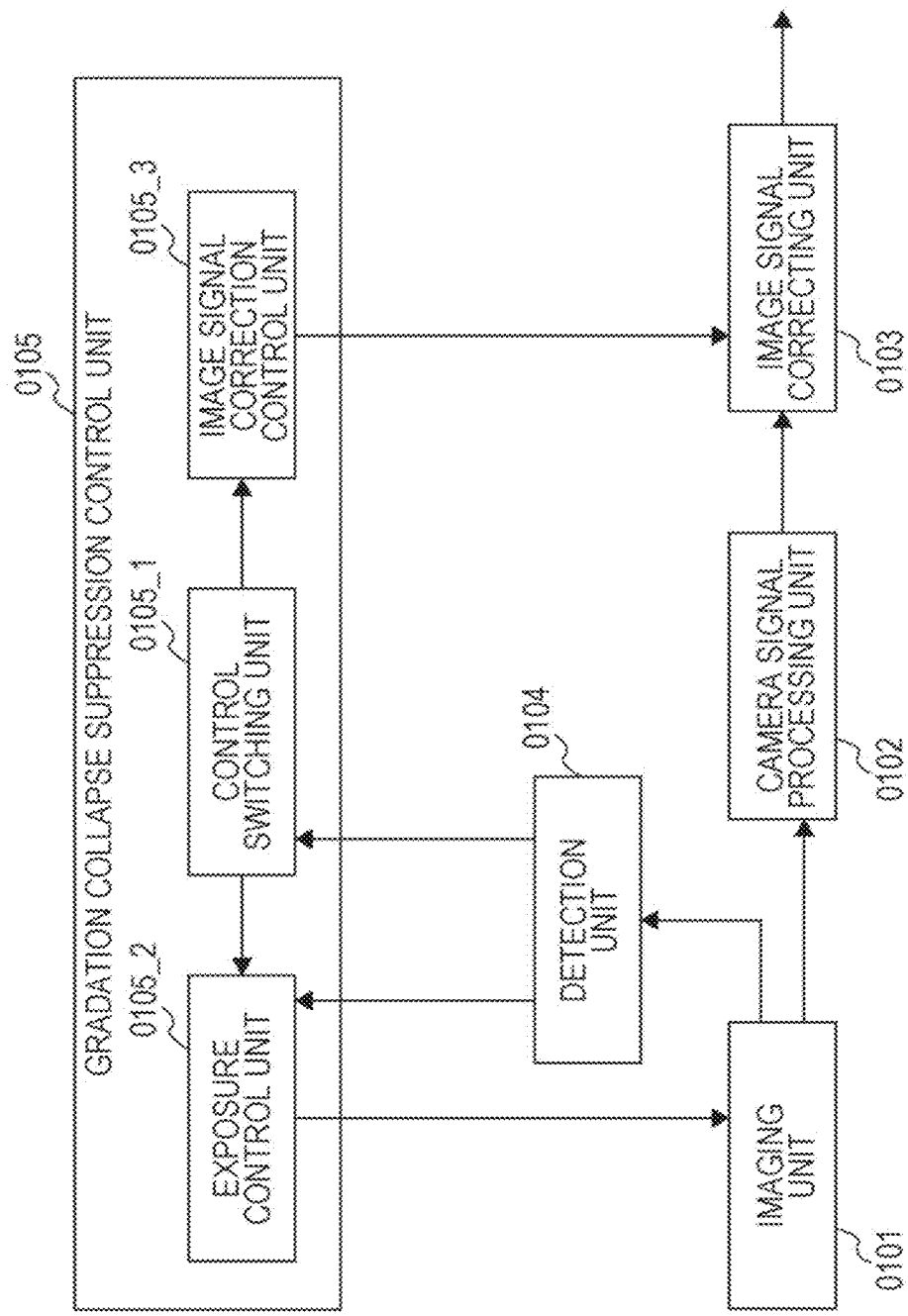
FIG. 1 is a schematic diagram illustrating an imaging apparatus according to a first embodiment of the present invention.

FIG. 1 is a schematic diagram illustrating an imaging apparatus according to a first embodiment of the present invention. In FIG. 1, 0101 shows an imaging unit, 0102 shows a camera signal processing unit, 0103 shows an image signal correcting unit, 0104 shows a detection unit, 0105 shows a gradation collapse suppression control unit, 0105_1 shows a control switching unit, 0105_2 shows an exposure control unit, and 0105_3 shows an image signal correction control unit.

In the imaging apparatus illustrated in FIG. 1, the imaging unit 0101 is configured by appropriately using a lens group including a zoom lens and a focus lens, an imaging element such as an iris, a shutter, a CCD, and a CMOS, a CDS, an AGC, or an AD converter. The imaging unit 0101 performs photoelectric conversion on an optical image received by the imaging element, by exposure based on exposure conditions such as an aperture of the iris, an accumulation time of a sensor, a shutter speed, and a gain amount of the AGC, and outputs the optical image as an image signal.

The camera signal processing unit 0102 executes various camera image processes such as a digital gain process, a demosaicking process, a brightness signal and color signal generation process, and a noise correction process on the image signal output by the imaging unit 0101 and outputs the image signal as a video signal.

The image signal correcting unit 0103 corrects a signal level to be a signal value of each pixel of the video signal, on the video signal output by the camera signal processing unit 0102, on the basis of a predetermined input/output characteristic and a correction strength parameter acquired from the image signal correction control unit 0105_3, and outputs the video signal as a final video signal. An example of this process will be described below using FIG. 3.

The detection unit 0104 calculates a feature amount such as histogram data, an average value, and a maximum value of signal values in a predetermined region, from the image signal output by the imaging unit 0101, and outputs the feature amount as detection data.

The control switching unit 0105_1 evaluates a degree of gradation collapse such as halation or black saturation in the image signal, on the basis of the detection data output by the detection unit 0104, switches which of normal control and gradation collapse suppression priority control is executed, according to an evaluation result, and outputs a state of the executed control. Here, the normal control means that an exposure condition of the imaging unit 0101 or a signal level correction process of the image signal correcting unit 0103 is controlled such that an attention subject has brightness and image quality where high visibility is obtained. In addition, the gradation collapse suppression priority control means that the exposure condition of the imaging unit 0101 or the signal level correction process of the image signal correcting unit 0103 is controlled such that a high brightness subject having the halation or a low brightness subject having the black saturation when the normal control is performed has brightness where high visibility is obtained. The subject having the halation shows a portion of the image signal in which brightness has a maximum value (255) or a portion in which brightness has almost the maximum value and a degree of the halation shows a ratio of pixels in which the brightness has the maximum value or has almost the maximum value, for pixels of the image signal. Likewise, the subject having the black saturation shows a portion of the image signal in which the brightness has a minimum value (0 or a black level corresponding to the brightness when the imaging element is shielded from light) or a portion in which the brightness has almost the minimum value and a degree of the black saturation shows a ratio of pixels in which the brightness has the minimum value or has almost the minimum value, for pixels of the image signal. The pixels in which the brightness has almost the maximum value/minimum value can be determined according to whether the brightness is equal to or larger than/smaller than a predetermined threshold value. In addition, to evaluate the degree of the gradation collapse is to determine whether the degree of the gradation collapse is equal to or larger than a threshold value.

Hereinafter, the case in which the gradation collapse is halation in an image signal will be described as an example to simplify description. For example, when a moving image is imaged by the normal control, the control switching unit 0105_1 sequentially evaluates the degree of the halation in the image signal from the detection data output by the detection unit 0104. When it is determined that the high brightness subject having the halation is generated in the viewing angle, the control switching unit 0105_1 switches the control into halation suppression priority control. In addition, in the case in which imaging is performed by the halation suppression priority control, if it is determined that the high brightness subject having the halation does not exist in the viewing angle even though the control returns to the normal control, the control switching unit 0105_1 switches the control into the normal control. An example of this control will be described below using FIG. 5.

When the normal control is performed on the basis of a state of the control output by the control switching unit 0105_1, the exposure control unit 0105_2 controls exposure of the imaging unit 0101 such that the attention subject has brightness where high visibility is obtained, while referring to the detection data output by the detection unit 0104. In addition, when the halation suppression priority control is performed, the exposure control unit 0105_2 controls exposure of the imaging unit 0101 to make a target value of the exposure smaller than a target value of the exposure when the normal control is performed, such that the high brightness subject having the halation when the normal control is performed has brightness where the high visibility is obtained. An example of this control will be described below using FIGS. 2A to 2C.

The image signal correction control unit 0105_3 determines a correction strength parameter, on the basis of the state of the control output by the control switching unit 0105_1, such that the image signal correction control unit 0105_3 executes a correction process of a signal level with a predetermined characteristic becoming a predetermined reference when the normal control is performed. When the halation suppression priority control is performed, the image signal correction control unit 0105_3 determines the correction strength parameter such that a correction amount of a signal level of a dark portion increases particularly as compared with the normal control, by considering that the imaging unit 0101 performs imaging with a small target value of the exposure as compared with the normal control. An example of this control will be described below using FIGS. 4A and 4B.

Thereby, when the high brightness subject does not exist in the viewing angle, video in which the attention subject has optimal brightness and image quality is generated and when the high brightness subject exists in the viewing angle, video in which the visibility of the high brightness subject is improved by suppressing the halation of the high brightness subject and the visibility of the attention subject other than the high brightness subject is also maintained by the correction process of the signal level is generated. Therefore, it is possible to provide video in which the visibility and the image quality are improved adaptively to a change of a scene in which the high brightness subject frequently appears or disappears.

The description using the halation has been given as the example of the suppression of the gradation collapse. However, the case of suppressing the black saturation is also the same. That is, when the low brightness subject having the black saturation is generated in the viewing angle by the normal control, the control switching unit 0105_1 switches the control into the black saturation suppression priority control, the exposure control unit 0105_2 controls the exposure of the imaging unit 0101 such that the target value of the exposure in the black saturation suppression priority control is larger than the target value of the exposure in the normal control, and the image signal correction control unit 0105_3 determines the correction strength parameter of the image signal correction control unit 0105_3 such that a correction amount of a signal level of a light portion increases particularly as compared with the normal control. Thereby, when the low brightness subject exists in the viewing angle, video in which the visibility of the low brightness subject is improved by suppressing the black saturation of the low brightness subject and the visibility of the attention subject is maintained by the correction process of the signal level can be generated. In addition, when both the halation and the black saturation are generated in the video, it may be previously determined which of the control to suppress the halation and the control to suppress the black saturation has priority or a user may select the control to give priority and may input the selected control from a user input unit not illustrated in the drawings.

The imaging apparatus illustrated in FIG. 1 is described, focusing on a processing unit directly associated with the present invention. However, a high image quality making process, a signal format conversion process, and a compression/extension process other than an image process that are important actually when the image process is executed may be executed before and after each process and in the middle of each process.

In addition, each process configuring the imaging apparatus illustrated in FIG. 1 is executed by an application on a CPU in the case of a personal computer and is executed by a microcomputer, a DSP, and a dedicated LSI in the case of an assembly apparatus, except for the imaging unit 0101. A signal process such as the acquisition of the histogram data or the signal level correction process is executed on the DSP or the dedicated LSI and a control process such as the control switching process, the exposure control, and the correction strength parameter control of the signal level correction process is executed by the microcomputer, so that optimization of a cost or performance may be performed.

Figure 2A:
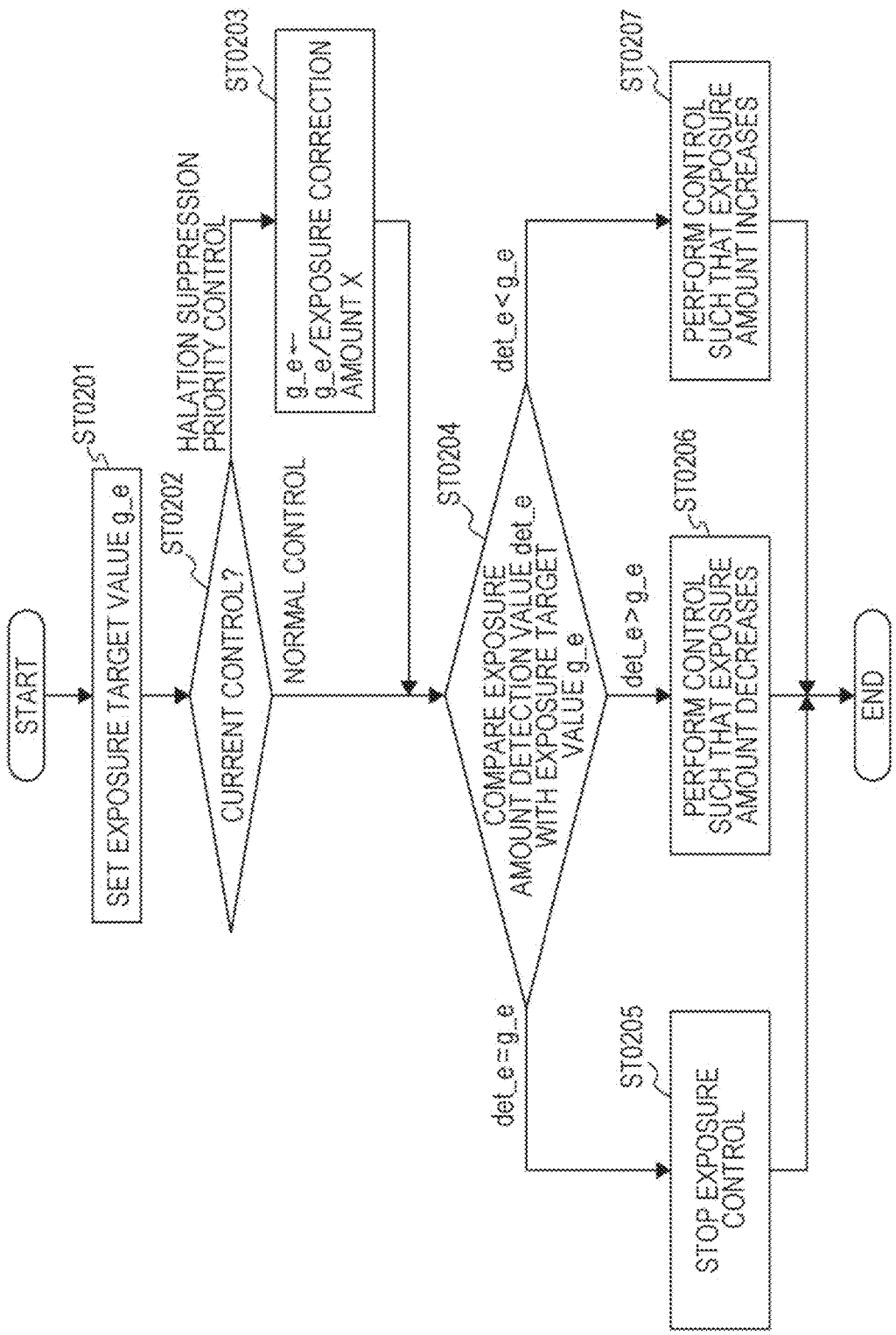
FIG. 2A is a diagram illustrating an example of a process sequence regarding exposure control of the imaging apparatus according to the first embodiment of the present invention.

FIGS. 2A to 2C are diagrams illustrating an example of the exposure control according to the first embodiment of the present invention. In the present invention, the exposure control is performed by the exposure control unit 0105_2.

FIG. 2A is a diagram illustrating an example of a process sequence regarding the exposure control of the imaging apparatus according to the first embodiment of the present invention. In the process sequence regarding the exposure control illustrated in FIG. 2A, in ST0201, an exposure target value g_e is set such that the attention subject has brightness where the high visibility is obtained. The exposure target value g_e can be determined as follows, for example. A subject positioned at about the center of the viewing angle is regarded as an important subject, an inner portion of a predetermined region set to about the center of the viewing angle is defined as the attention subject, the visibility is made to be highest when average brightness in the predetermined region reaches certain brightness by controlling the exposure, and if this state is set to a target of the exposure, a target value of the average brightness in the predetermined region becomes the exposure target value g_e. The exposure target value g_e is previously stored as an adjustment value in a storage unit (not illustrated in the drawings) such as non-volatile memory. In ST0201, the exposure control unit 0105_2 reads the exposure target value g_e from the storage unit and sets the exposure target value g_e.

In ST0202, a state of the current control is acquired from the control switching unit 0105_1. When the current control is the halation suppression priority control, the process proceeds to ST0203 and when the current control is the normal control, the process proceeds to ST0204.

In ST0203, the exposure target value is decreased by dividing the exposure target value g_e by a predetermined exposure correction amount X. The exposure correction amount X is determined by previously measuring a representative illuminance ratio of approximate brightness of a subject having useful information such as display of an electronic bulletin board or a number plate with a light source in the light brightness subject and approximate brightness of the attention subject. The exposure correction amount X is previously stored as an adjustment value in a storage unit (not illustrated in the drawings) such as a non-volatile memory. In ST0203, the exposure control unit 0105_2 reads the exposure target value g_e from the storage unit and performs correction by the exposure correction amount X of the exposure target value g_e.

In ST0204, an exposure detection value det_e and the exposure target value g_e are compared with each other. The exposure detection value det_e is the average brightness in the predetermined region set to about the center of the viewing angle as described above and is acquired as the detection data from the detection unit 0104. As a comparison result, when the exposure detection value det_e is almost equal to the exposure target value g_e, the process proceeds to step ST0205, when the exposure detection value det_e is significantly larger than the exposure target value g_e, the process proceeds to step ST0206, and when the exposure detection value det_e is significantly smaller than the exposure target value g_e, the process proceeds to step ST0207. When it is determined whether the exposure detection value det_e is almost equal to the exposure target value g_e, the exposure detection value det_e is significantly larger than the exposure target value g_e, and the exposure detection value det_e is significantly smaller than the exposure target value g_e, the following method is considered. For example, two threshold values are set and when a difference of the exposure detection value det_e and the exposure target value g_e is larger than a large threshold value, it is determined that the exposure detection value det_e is significantly larger than the exposure target value g_e, when the difference of the exposure detection value det_e and the exposure target value g_e is smaller than a small threshold value, it is determined that the exposure detection value det_e is significantly smaller than the exposure target value g_e, and when the difference of the exposure detection value det_e and the exposure target value g_e is a value between the two threshold values, it is determined that the exposure detection value det_e is almost equal to the exposure target value g_e. However, this embodiment is not limited to the above method.

In ST0205, it is determined that the exposure already reaches appropriate exposure and the exposure control is stopped.

In ST0206, it is determined that the current exposure amount is larger than the target value and brightness is larger than brightness by the appropriate exposure and the exposure control is performed such that the exposure amount decreases. For example, the exposure amount is decreased by decreasing the gain of the AGC, decreasing the accumulation time of the sensor, and decreasing the aperture of the iris.

In ST0207, it is determined that the current exposure amount is smaller than the target value and the brightness is smaller than the brightness by the appropriate exposure and the exposure control is performed such that the exposure amount increases. For example, the exposure amount is increased by increasing the gain of the AGC, increasing the accumulation time of the sensor, and increasing the aperture of the iris.

FIG. 2B illustrates an example of an operation of the exposure control of the imaging apparatus according to the first embodiment of the present invention in the case in which the high brightness subject having the halation does not exist in the viewing angle. As illustrated in FIG. 2B, when the high brightness subject having the halation does not exist in the viewing angle, the normal exposure control is selected. For this reason, the exposure is controlled such that brightness of a vehicle to be the attention subject is optimized and high visibility can be obtained.

FIG. 2C illustrates an example of an operation of the exposure control of the imaging apparatus according to the first embodiment of the present invention when the high brightness subject having the halation exists in the viewing angle. As illustrated in FIG. 2C, when the high brightness subject having the halation exists in the viewing angle, the halation suppression priority exposure control is selected. For this reason, the exposure is controlled such that the exposure target decreases as compared with the normal control and visibility of a facing vehicle to be the high brightness subject is improved.

As such, the exposure control unit 0105_2 can control the exposure such that the brightness of the attention subject becomes appropriate, when the normal control is performed. In the halation suppression priority control, after the high brightness subject having the useful information is made not to have the halation, the exposure can be controlled such that brightness of other subject comes close to an appropriate value maximally. In addition, when a moving image is imaged, the subject having the halation is generated in the viewing angle, and the control is switched from the normal control to the halation suppression priority control, control becomes feedback control in which a necessary exposure control amount is determined uniquely, because the exposure target value g_e is corrected with the known exposure correction amount X. That is, a change amount in the gain of the AGC or the accumulation time of the sensor can be determined immediately and the exposure control at the time of switching can be performed stably at a high speed. The case in which the control is switched from the halation suppression priority control to the normal control is also the same.

In the above example, the attention subject is set as the predetermined region near the center of the screen. However, the present invention is not limited thereto. For example, a camera may be arranged with a depression angle and when an important subject is likely to be reflected in a lower portion of the screen, a predetermined region of the lower portion of the screen may be set as the attention subject. In addition, a specific subject such as a face of a person or a vehicle may be detected from an image by image recognition and a local region including the specific subject may be set as the attention subject. Thereby, the exposure can be appropriately performed first on a subject which a user desires to view, according to uses.

In the above example, the average brightness in the predetermined region is used as the exposure detection value det_e. However, a method using a load average of average brightness in a plurality of predetermined regions or a method using a combination of other feature amounts such as a maximum value or a minimum value is known as an example of general exposure control and these methods may be combined.

In addition, in the above example, only execution or non-execution of division of the high correction amount X for the exposure target value g_e is switched between the normal control and the halation suppression priority control. However, the method of the exposure control may be switched. For example, in the normal control, the exposure is controlled such that the exposure detection value det_e and the exposure target value g_e are matched as in the above example and in the halation suppression priority control, the exposure is controlled until the maximum value of the predetermined region in the image signal becomes smaller than a desired value. Thereby, video in which the halation does not exist can be generated.

In addition, when the exposure detection value det_e and the exposure target value g_e are compared, hysteresis values α and β may be provided in the exposure target value g_e and a magnitude relation of det_e and g_e+α and g_e−β may be compared. Thereby, even when the exposure amount detection value det_e is varied due to an influence of noise, the exposure control can execute a stable operation without causing an erroneous operation due to the influence of the variation.

Figure 3:
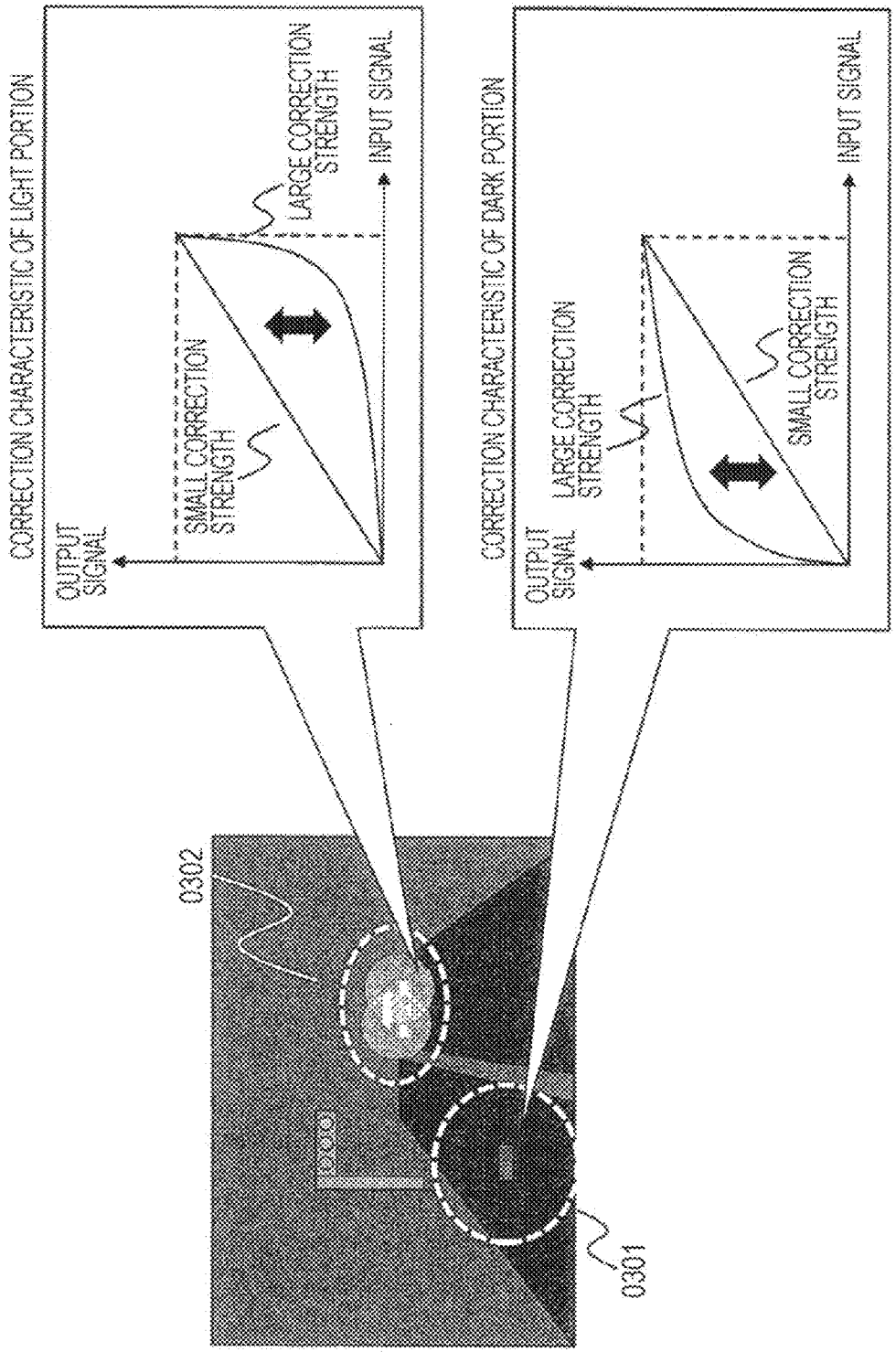
FIG. 3 is a diagram illustrating an example of a signal level correction process of the imaging apparatus according to the first embodiment of the present invention.

FIG. 3 is a diagram illustrating an example of the signal level correction process of the imaging apparatus according to the first embodiment of the present invention. In the present invention, the signal level correction process is executed by the image signal correcting unit 0103.

In FIG. 3, 0301 shows a representative subject region existing in a dark portion in a video signal and 0302 shows a representative subject region existing in a light portion in the video signal. The image signal correcting unit 0103 has an input/output characteristic becoming a different correction characteristic in each of the dark portion and the light portion in advance and performs correction of a signal level by applying the corresponding input/output characteristic according to whether an attention pixel exists in the dark portion or exists in the light portion. Because the region shown by 0301 is the subject region existing in the dark portion, visibility of the dark subject can be improved by executing correction with the input/output characteristic to raise a signal level. In addition, because the region shown by 0302 is the subject region existing in the light portion, visibility of the light subject can be improved by executing the correction with the input/output characteristic to sink a signal level. Here, the input/output characteristic of the dark portion and the input/output characteristic of the light portion are corrected according to the correction strength parameter acquired from the image signal correction control unit 0105_3. For this reason, when the correction strength parameter is small, the correction can be weakened by making the input/output characteristic similar to an input/output characteristic in which an input and an output are matched.

Thereby, visibility in the black saturation region or the halation region can be improved by correcting the gradation adaptively according to the brightness of the subject and execution or non-execution of the correction or a degree of the correction can be changed according to necessity by inputting the correction strength parameter.

The determination on whether an attention pixel exists in the dark portion or exists in the light portion is performed by calculating a low frequency component of a brightness signal from an average value of brightness of a local region including the attention pixel and executing a threshold process on the calculated low frequency component.

Figure 4A:
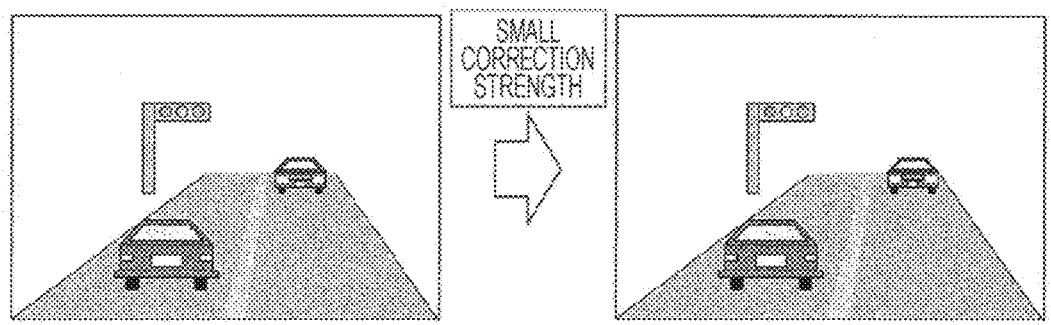
FIG. 4A is a diagram illustrating an example of an operation of a signal level correction strength parameter control process of the imaging apparatus according to the first embodiment of the present invention in the case in which a high brightness subject having halation does not exist in a viewing angle.
Figure 4B:
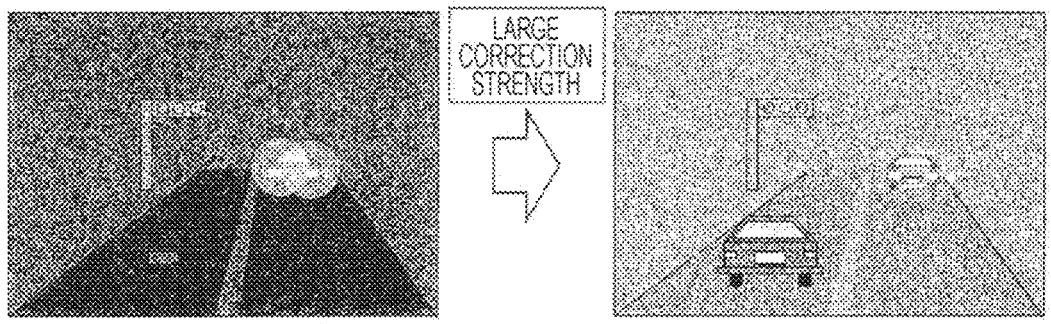
FIG. 4B is a diagram illustrating an example of an operation of a signal level correction strength parameter control process of the imaging apparatus according to the first embodiment of the present invention in the case in which a high brightness subject having halation exists in a viewing angle.

FIGS. 4A and 4B are diagrams illustrating an example of a signal level correction strength parameter control process of the imaging apparatus according to the first embodiment of the present invention. In the present invention, the signal level correction strength parameter control process is executed by the image signal correction control unit 0105_3.

FIG. 4A illustrates an example of an operation of the signal level correction strength parameter control process of the imaging apparatus according to the first embodiment of the present invention in the case in which the high brightness subject having the halation does not exist in the viewing angle. As illustrated in FIG. 4A, when the high brightness subject having the halation does not exist in the viewing angle, the exposure control unit 0105_2 selects the normal exposure control. Therefore, because the video signal output by the camera signal processing unit 0102 is already video having high visibility, the image signal correction control unit 0105_3 determines the correction strength parameter such that a degree of the correction of the signal level decreases. For this reason, in the corrected video, unnaturalness of video or emphasis of noise occurring when the signal level is corrected more than required can be suppressed.

FIG. 4B illustrates an example of an operation of the signal level correction strength parameter control process of the imaging apparatus according to the first embodiment of the present invention in the case in which the high brightness subject having the halation exists in the viewing angle. As illustrated in FIG. 4B, when the high brightness subject having the halation exists in the viewing angle, the exposure control unit 0105_2 selects the halation suppression priority exposure control. Therefore, in the video signal output by the camera signal processing unit 0102, visibility of a facing vehicle to be the high brightness subject is improved, but a leading vehicle existing in the dark portion becomes dark and visibility thereof is deteriorated. Thus, the image signal correction control unit 0105_3 determines the correction strength parameter such that the degree of the correction of the signal level of the dark portion increases in particular. Thereby, the corrected video can have high visibility with respect to both the facing vehicle to be the high brightness subject and the leading vehicle not to be the high brightness subject.

As such, when the normal control is performed, the image signal correction control unit 0105_3 decreases the correction strength of the signal level and suppresses the video collapse or the emphasis of the noise, thereby generating video having high image quality. In the halation suppression priority control, the exposure control to suppress the halation is performed, so that the visibility of the attention subject other than the high brightness subject in which the visibility is deteriorated can be improved. In addition, even when a moving image is imaged, the subject having the halation is generated in the viewing angle, and the control is switched from the normal control to the halation suppression priority control, switching of the correction strength of the signal level is enabled at the same timing as switching of the exposure control and omission can be prevented from being generated due to the deterioration of the visibility.

FIG. 5 is a diagram illustrating an example of a process sequence regarding the control switching process of the imaging apparatus according to the first embodiment of the present invention. In the present invention, the control switching process is executed by the control switching unit 0105_1. The control switching process is executed repetitively at a constant time interval such as a frame unit or a variable time interval, in the control switching unit 0105_1.

In the process sequence regarding the control switching process illustrated in FIG. 5, in ST0501, it is determined whether the state of the current control is the normal control or the halation suppression priority control, by referring to the memory. When the current control is the normal control, the process proceeds to ST0502 and when the current control is the halation suppression priority control, the process proceeds to ST0509.

In ST0502, the number N1 of pixels in which a signal value is more than a brightness threshold value 11 in the predetermined region of the image signal is acquired as the detection data from the detection unit 0104 and the process proceeds to ST0503. The brightness threshold value 11 is determined previously near the saturation of the signal value. Thereby, N1 becomes an area of the high brightness subject having the halation in the image imaged by the normal control.

In ST0503, N1 is compared with the high brightness subject determination threshold value th1. When N1 is a value equal to or larger than th1, it is determined that the high brightness subject having the halation has been generated and the process proceeds to ST0504. When N1 is smaller than th1, it is determined that the high brightness subject having the halation does not exist and the process proceeds to ST0507. As the high brightness subject determination threshold value th1, a value larger than a representative value of a point light source is previously determined to exclude an influence of a high brightness subject that is unlikely to include useful information, such as the point light source. Thereby, only a high brightness subject that is likely to include useful information, such as an electronic bulletin board, can be determined.

In ST0504, a counter cnt1 to count a length of a period during which it is determined that the high brightness subject has been generated continuously is incremented and the process proceeds to ST0505.

In ST0505, cnt1 is compared with a period threshold value M1. When cnt1 is a value equal to or larger than M1, it is determined that the high brightness subject having the halation continuously exists during a constant period and the process proceeds to ST0506. When cnt1 is smaller than M1, the process proceeds to ST0508. An example of a method of determining M1 will be described below using FIG. 7.

In ST0506, a state of the control of a next frame is switched into the halation suppression priority control, the state of the control is stored in the memory, and the process ends. Thereby, in the case in which the normal control is performed, if it is determined that the high brightness subject having the halation has been generated, the control can be immediately switched into the halation suppression priority control and visibility of the high brightness subject can be improved.

In ST0507, cnt1 is initialized to 0 and the process proceeds to ST0508.

In ST0508, a state of the control of a next frame is maintained at the normal control and the process ends.

In ST0509, the number N2 of pixels in which a signal value is more than a brightness threshold value 12 in the predetermined region of the image signal is acquired as the detection data from the detection unit 0104 and the process proceeds to ST0510. The brightness threshold value 12 is set previously as a threshold value to determine brightness of a subject predicted as having the halation, when the normal exposure is performed. An example of a method of determining the brightness threshold value 12 will be described below using FIGS. 6A and 6B.

In ST0510, N2 is compared with the high brightness subject determination threshold value th2. When N2 is smaller than th2, it is determined that the high brightness subject having the halation has disappeared when the control returns to the normal control and the process proceeds to ST0511. When N2 is equal to or larger than th2, it is determined that the high brightness subject having the halation exists when the control returns to the normal control and the process proceeds to ST0514. The high brightness subject determination threshold value th2 is determined by the same standard as that of the high brightness subject determination threshold value th1 and an example of a method of determining the high brightness subject determination threshold value will be described below using FIG. 8.

In ST0511, a counter cnt2 to count a length of a period during which it is determined that the high brightness subject has disappeared continuously is incremented and the process proceeds to ST0512.

In ST0512, cnt2 is compared with a period threshold value M2. When cnt2 is a value equal to or larger than M2, it is determined that the high brightness subject having the halation does not exist continuously during a constant period when the control returns to the normal control and the process proceeds to ST0513. When cnt2 is smaller than M2, the process proceeds to ST0515. The period threshold value M2 is determined by the same standard as that of the period threshold value M1.

In ST0513, a state of the control of a next frame is switched into the normal control, the state of the control is stored in the memory, and the process ends. Thereby, in the case in which the halation suppression priority control is performed, if it is determined that the high brightness subject having the halation does not exist when the control returns to the normal control, the control can be immediately switched into the normal control and video can be returned to video in which brightness of an attention subject is appropriate and image quality is high.

In ST0514, cnt2 is initialized to 0 and the process proceeds to ST0515.

In ST0515, a state of the control of a next frame is maintained at the halation suppression priority control and the process ends.

Thereby, control in which priority is given to improvement of visibility of a high brightness subject and control in which priority is given to image quality of an attention subject can be switched immediately according to whether the high brightness subject having the halation exists in the viewing angle. Particularly, when the control is switched from the halation suppression priority control to the normal control, in the feedback control according to the related art in which the exposure target is increased gradually while the degree of the halation is viewed, responsiveness may be deteriorated or overcorrection may be performed until the exposure control is completed and the halation may occur. Meanwhile, in the control based on this embodiment, the control can be switched immediately after it is ensured that the halation does not occur, even when the control returns to the normal control. For this reason, even when a high brightness subject such as a vehicle with a lamp moving at a high speed moves in or out of the viewing angle, it is possible to stably provide video in which visibility is improved optimally to each scene, with high responsiveness.

FIGS. 6A and 6B are diagrams illustrating an example of a method of determining the brightness threshold value 12 in the control switching process of the imaging apparatus according to the first embodiment of the present invention.

FIG. 6A illustrates an example of a scene in which the halation suppression priority exposure control is applied and a facing vehicle corresponding to a high brightness subject exists in the viewing angle, as a first example of video in the case in which the halation suppression priority control is performed in the imaging apparatus according to the first embodiment of the present invention.

In the halation suppression priority exposure control, the brightness threshold value 12 for the high brightness subject determination in the halation suppression priority control is set as a value obtained by dividing the brightness threshold value 11 for the high brightness subject determination in the normal control by 1/X, by considering that the exposure amount becomes 1/X of the exposure amount in the case in which the normal exposure control is applied. As illustrated in FIG. 6A, the high brightness subject having the halation by the normal exposure control is distributed in a range of values larger than 12 in a histogram obtained by the halation suppression priority exposure control. For this reason, if the number of pixels having signal values equal to or larger than the brightness threshold value 12 is large, it can be determined that the halation occurs when the control returns to the normal control.

FIG. 6B illustrates an example of a scene in which the halation suppression priority exposure control is applied and a high brightness subject does not exist in the viewing angle, as a second example of video in the case in which the halation suppression priority control is performed in the imaging apparatus according to the first embodiment of the present invention.

As illustrated in FIG. 6B, when the high brightness subject having the halation by the normal exposure control does not exist in the viewing angle, the high brightness subject does not exist in a range of values larger than 12 in a histogram obtained by the halation suppression priority exposure control. For this reason, if the number of pixels having a signal value equal to or larger than the brightness threshold value 12 is small, it can be determined that the halation does not occur even when the control returns to the normal control.

As such, the brightness threshold value in the halation suppression priority control is determined from the brightness threshold value of the normal control and the exposure correction amount and when the halation suppression priority control is performed, it is determined with high precision whether the halation occurs when the control returns to the normal control. The control returns to the normal control only when the halation does not occur and switching control can be stably performed.

Figure 7:
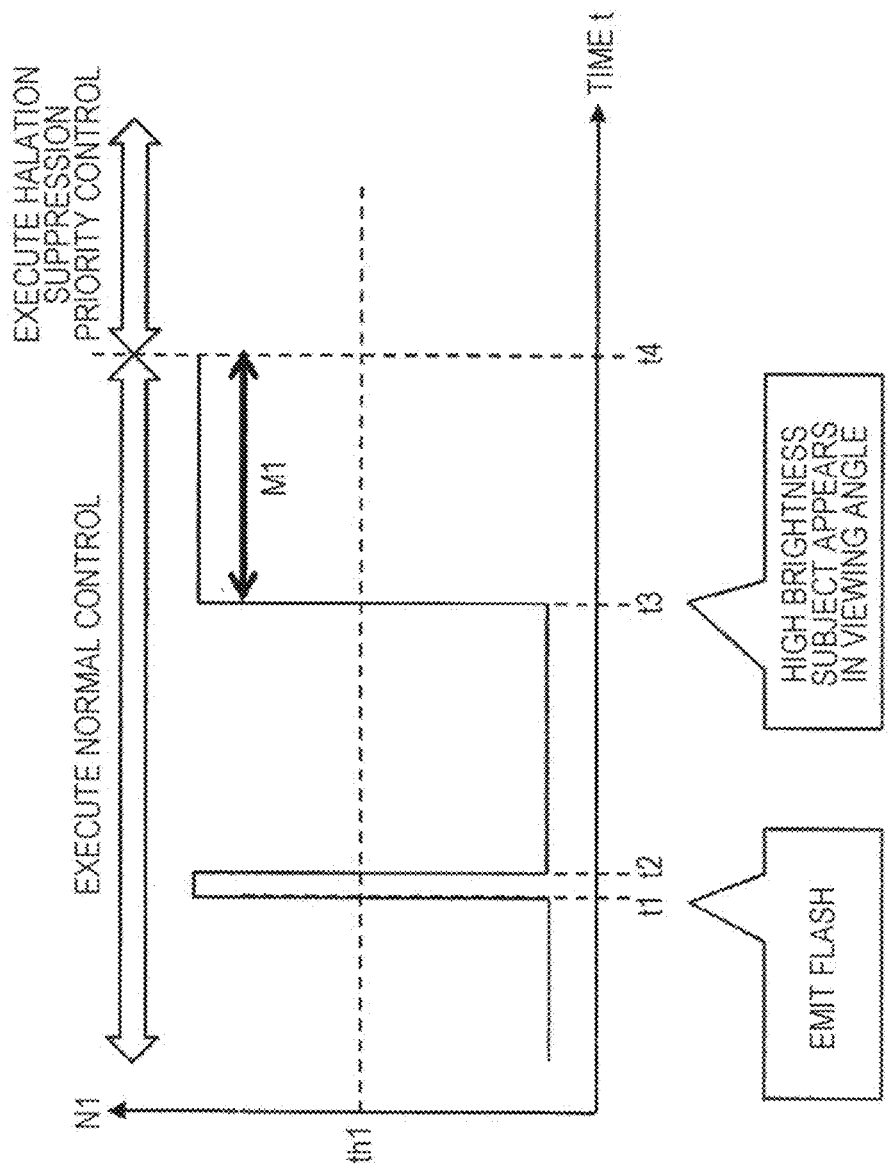
FIG. 7 is a diagram illustrating an example of a method of determining a period threshold value M1 in a control switching process of the imaging apparatus according to the first embodiment of the present invention.

FIG. 7 is a diagram illustrating an example of a method of determining the period threshold value M1 in the control switching process of the imaging apparatus according to the first embodiment of the present invention.

In FIG. 7, a horizontal axis shows an imaging time and a vertical axis shows a high brightness subject pixel number N1 calculated at each time. In this example, a subject changes according to the imaging time. During a period until a time t1 and a period from a time t2 to a time t3, the high brightness subject does not exist in the viewing angle, during a period from the time t1 to the time t2, a flashlight disappearing in a minute time is turned on in the viewing angle, and during a period after the time t3, the high brightness subject such as the facing vehicle not disappearing in a minute time exists in the viewing angle. At this time, as described using FIG. 5, when the high brightness subject pixel number N1 is continuously more than the high brightness subject determination threshold value th1, the control switching unit 0105_1 increments the counter cnt1 according to a period thereof and when cnt1 is more than the period threshold value M1, the control switching unit 0105_1 switches the control from the normal control to the halation suppression priority control. Therefore, the period threshold value M1 is set as a value sufficiently larger than t2−t1, so that the control is not switched when it is determined whether the momentary high brightness subject such as the flashlight exists and the control is switched when the facing vehicle is generated, thereby improving stability of the control. Also, the period threshold value M2 when the halation suppression priority control is executed is set equally, so that the control is not switched when light disappears momentarily, thereby improving stability of the control.

FIG. 8 is a diagram illustrating an example of a method of determining the high brightness subject determination threshold value th2 in the control switching process of the imaging apparatus according to the first embodiment of the present invention.

In FIG. 8, a horizontal axis shows a high brightness subject pixel number N1 or N2 and a vertical axis shows a determination result on which the control switching unit 0105_1 switches the control into for setting next control. As illustrated in FIG. 8, the high brightness subject determination threshold value th2 in the halation suppression priority control is set to a value smaller than the high brightness subject determination threshold value th1 in the normal control. Thereby, when the high brightness subject pixel number exists near a range between th1 and th2, it is relatively easy to change the control from the normal control to the halation suppression priority control and it is relatively difficult to change the control from the halation suppression priority control to the normal control. As such, th1 and th2 are set differently. As a result, when the detection data of the high brightness subject pixel number is changed for each time due to the influence of the flicker or the noise, switching of the control can be suppressed from being alternately repeated and the control can be stabilized.

As such, according to this embodiment, it is possible to stably provide video in which visibility and image quality are improved adaptively to each scene, with high responsiveness to the change in the presence or absence of the high brightness subject in the imaging viewing angle.

Second Embodiment

Figure 9A:
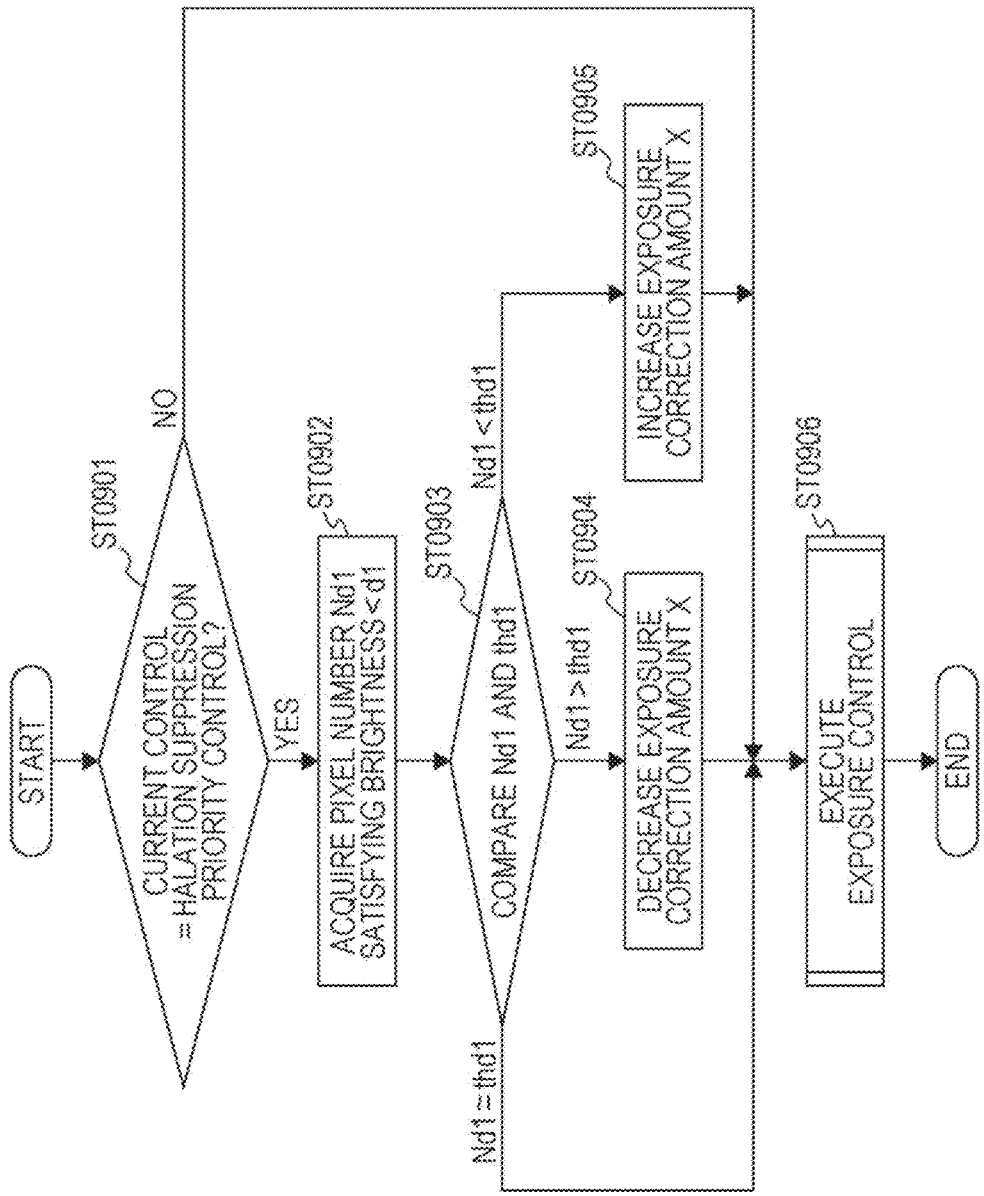
FIG. 9A is a diagram illustrating an example of a process sequence regarding a first example of exposure control of an imaging apparatus according to a second embodiment of the present invention.

FIGS. 9A to 9C are diagrams illustrating a first example of exposure control according to a second embodiment of the present invention. In the present invention, the first example of the exposure control is executed by an exposure control unit 0105_2.

FIG. 9A illustrates an example of a process sequence regarding the first example of the exposure control of an imaging apparatus according to the second embodiment of the present invention, FIG. 9B illustrates an example of an operation when the exposure control of the imaging apparatus according to the first embodiment of the present invention is applied, and FIG. 9C illustrates an example of an operation when the first example of the exposure control of the imaging apparatus according to the second embodiment of the present invention is applied.

In the process sequence regarding the first example of the exposure control illustrated in FIG. 9A, in ST0901, a state of current control is acquired from a control switching unit 0105_1. When the state of the current control is halation suppression priority control, the process proceeds to ST0902 and when the state of the current control is normal control, the process proceeds to ST0906.

In ST0902, the number Nd1 of pixels in which a signal value is smaller than a brightness threshold value d1 in a predetermined region of an image signal is acquired as detection data from a detection unit 0104 and the process proceeds to ST0903. The brightness threshold value d1 is determined previously near a black level of the signal value. Thereby, Nd1 becomes an area of a subject having black saturation in an image imaged by the halation suppression priority control.

In ST0903, the black saturation pixel number Nd1 is compared with a black saturation determination threshold value thd1. When Nd1 is significantly larger than thd1, it is determined that the black saturation exists and the process proceeds to ST0904. When Nd1 is significantly smaller than thd1, it is determined that the black saturation does not exist and the process proceeds to ST0905. When Nd1 is almost equal to thd1, it is determined that the black saturation is likely to occur when an exposure correction amount is further increased and the process proceeds to ST0906. The black saturation determination threshold value thd1 is determined on the basis of a representative ratio of a low brightness subject existing naturally in a viewing angle, such as a black pattern or a shadow. When it is determined whether the black saturation pixel number Nd1 is almost equal to the black saturation determination threshold value thd1, the black saturation pixel number Nd1 is significantly larger than the black saturation determination threshold value thd1, and the black saturation pixel number Nd1 is significantly smaller than the black saturation determination threshold value thd1, as described above, the following method is considered. For example, two threshold values are set and when a difference of the black saturation pixel number Nd1 and the black saturation determination threshold value thd1 is larger than a large threshold value, it is determined that the black saturation pixel number Nd1 is significantly larger than the black saturation determination threshold value thd1, when the difference of the black saturation pixel number Nd1 and the black saturation determination threshold value thd1 is smaller than a small threshold value, it is determined that the black saturation pixel number Nd1 is significantly smaller than the black saturation determination threshold value thd1, and when the difference of the black saturation pixel number Nd1 and the black saturation determination threshold value thd1 is a value between the two threshold values, it is determined that the black saturation pixel number Nd1 is almost equal to the black saturation determination threshold value thd1. However, this embodiment is not limited to the above method.

In ST0904, an exposure correction amount X is decreased and the process proceeds to ST0906. Thereby, when the black saturation occurs, the black saturation can be improved by decreasing the halation suppression.

In ST0905, the exposure correction amount X is increased and the process proceeds to ST0906. Thereby, when the black saturation does not occur, visibility of a high brightness subject can be improved by increasing the halation suppression.

In ST0906, the exposure control is performed using the controlled exposure correction amount X. The operation of the exposure control is as described using FIGS. 2A to 2C. When the normal control is performed, the exposure control is performed by referring to a predetermined exposure target value g_e. In the halation suppression priority control, the exposure control is performed while correction is performed using the exposure correction amount X obtained by controlling the predetermined exposure target value g_e.

As illustrated in FIG. 9B, when the exposure control according to the first embodiment of the present invention is applied, a high effect of suppressing the halation is obtained. However, when an illuminance difference of a high brightness subject and an attention subject other than the high brightness subject is very large, the black saturation is likely to occur in the attention subject other than the high brightness subject. As illustrated in FIG. 9C, when the exposure control according to the second embodiment of the present invention is applied, it is determined whether the black saturation exists, by referring to a distribution of pixels having signal values smaller than the brightness threshold value d1, and the exposure correction amount X is controlled. Therefore, it is possible to generate video in which the halation and the black saturation are suppressed in balance by decreasing the halation suppression, when the exposure target is excessively decreased and the black saturation becomes intense.

In the above example, when the black saturation pixel number Nd1 and the black saturation determination threshold value thd1 are compared, hysteresis values γ and Δ may be provided in the black saturation determination threshold value thd1 and a magnitude relation of Nd1 and thd1+γ and thd1−Δ may be compared. Thereby, even when the black saturation pixel number Nd1 is varied due to an influence of noise, the exposure control can execute a stable operation without causing an erroneous operation due to the influence of the variation.

In addition, when the exposure correction amount X is controlled, a maximum value and a minimum value may be provided in a control range of the exposure correction amount X and a limit process may be executed. Thereby, a highest effect of suppressing the halation and a lowest effect of suppressing the halation can be determined previously and can be ensured.

Figure 10A:
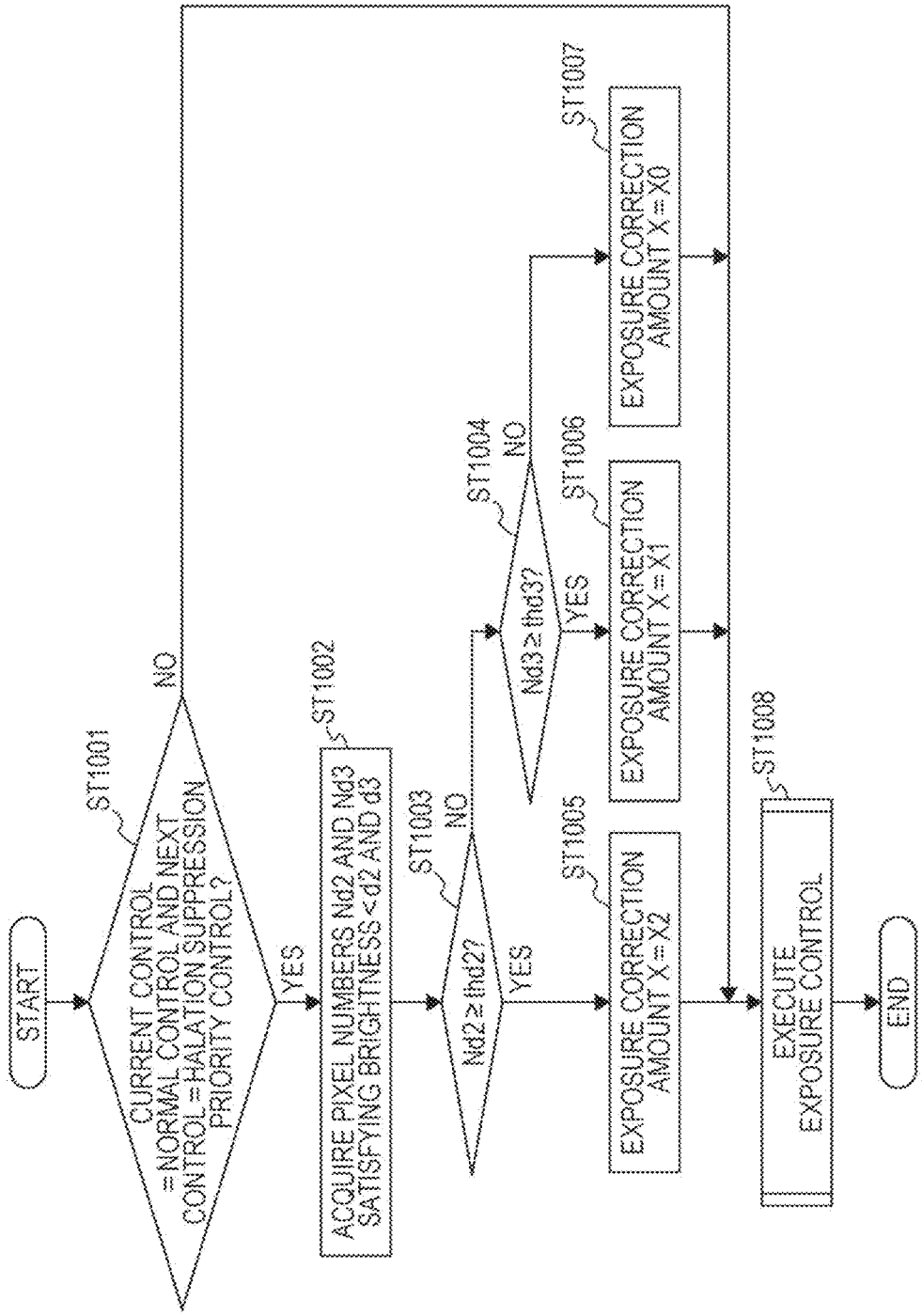
FIG. 10A is a diagram illustrating an example of a process sequence regarding a second example of the exposure control of the imaging apparatus according to the second embodiment of the present invention.

FIGS. 10A and 10B are diagrams illustrating a second example of the exposure control according to the second embodiment of the present invention. In the present invention, the second example of the exposure control is executed by the exposure control unit 0105_2.

FIG. 10A illustrates an example of a process sequence regarding the second example of the exposure control of the imaging apparatus according to the second embodiment of the present invention. FIG. 10B illustrates an example of an operation when the second example of the exposure control of the imaging apparatus according to the second embodiment of the present invention is applied.

In the process sequence regarding the second example of the exposure control illustrated in FIG. 10A, in ST1001, a state of current control and a state of next control are acquired from the control switching unit 0105_1. When the state of the current control is the normal control and the state of the next control is the halation suppression priority control, that is, when timing is timing at which control is switched from the normal control to the halation suppression priority control, the process proceeds to ST1002 and when the timing is other timing, the process proceeds to ST1008.

In ST1002, the number Nd2 of pixels having signal values smaller than the brightness threshold value d2 and the number Nd3 of pixels having signal values smaller than the brightness threshold value d3 in the predetermined region of the image signal are acquired as the detection data from the detection unit 0104 and the process proceeds to ST1003. The brightness threshold values d2 and d3 are set to satisfy a relation of d2<d3. Thereby, Nd2 becomes an area of a subject predicted as having the black saturation by the halation suppression priority control, when the exposure correction amount X is large. In addition, Nd3 becomes an area of a subject predicted as having the black saturation by the halation suppression priority control, when the exposure correction amount X is slightly large.

In ST1003, the first black saturation prediction pixel number Nd2 is compared with the black saturation determination threshold value thd2. If Nd2 is equal to or larger than thd2 and the exposure correction amount X is large, it is predicted that the black saturation occurs when the control is switched into the halation suppression priority control and the process proceeds to ST1005. If Nd2 is smaller than thd2, the process proceeds to ST1004.

In ST1004, the second black saturation prediction pixel number Nd3 is compared with the black saturation determination threshold value thd3. If Nd3 is equal to or larger than thd3 and the exposure correction amount X is slightly large, it is predicted that the black saturation occurs when the control is switched into the halation suppression priority control and the process proceeds to ST1006. If Nd3 is smaller than thd3, the process proceeds to ST1007. The black saturation determination threshold value thd2 or thd3 may be determined in the same way as the black saturation determination threshold value thd1.

In ST1005, X2 is set to the exposure correction amount X and the process proceeds to ST1008.

In ST1006, X1 is set to the exposure correction amount X and the process proceeds to ST1008.

In ST1007, X0 is set to the exposure correction amount X and the process proceeds to ST1008.

In ST1008, the exposure control is performed using the controlled exposure correction amount X. The operation of the exposure control is as described using FIGS. 2A to 2C. When the normal control is performed, the exposure control is performed by referring to the predetermined exposure target value g_e. In the halation suppression priority control, the exposure control is performed after correction is performed using the exposure correction amount X obtained by controlling the predetermined exposure target value g_e. For this reason, the values of X0 to X2 set to the exposure correction amount X in ST1005 to ST1007 are used as initial values of the exposure correction amount X when the halation suppression priority control starts. Here, X0 to X2 are the exposure correction amounts of the standards determined previously to satisfy a relation of X0>X1>X2. For this reason, it is possible to generate video in which the exposure correction amount X is previously decreased, the control is switched into the halation suppression priority control, the halation suppression is decreased, and the halation and the black saturation are suppressed in balance, when it is predicted that the black saturation occurs when the control is switched into the halation suppression priority control, if the number of pixels having the signal values smaller than the brightness threshold value d2 is large and the exposure correction amount X is large, as illustrated in FIG. 10B. In addition, it is possible to generate video in which the exposure correction amount X is previously increased and the halation suppression is increased, when it is predicted that the black saturation does not occur at the time of switching the control into the halation suppression priority control, even though the exposure correction amount X is large.

In the above example, after determining the initial value of the exposure correction amount X when the control is switched from the normal control to the halation suppression priority control, the first example of the exposure control illustrated in FIGS. 10A and 10B may be combined and the exposure correction amount X may be corrected. Thereby, it is possible to generate video in which the halation and the black saturation are suppressed in balance to be adaptive to the imaging scene can be generated, even when the brightness of the imaging scene changes or the degree of the black saturation changes after the control is switched.

As such, according to this embodiment, it is possible to stably provide video in which the halation and the black saturation are improved in balance to be adaptive to each scene, with high responsiveness to the change in the presence or absence of the high brightness subject in the imaging viewing angle. The present invention is not limited to the embodiments and various modifications are included.

For example, in the imaging apparatus illustrated in FIG. 1, the image signal correcting unit 0103 receives the video signal output by the camera signal processing unit 0102 and executes the correction process of the signal level. However, the image signal correcting unit 0103 may be provided between the imaging unit 0101 and the camera signal processing unit 0102. In this case, because the image signal correcting unit 0103 processes an image signal of a RAW format, a level correction process having a high degree of freedom can be executed without being affected by a variety of nonlinear signal processes executed in the camera signal processing unit.

In the embodiments, the halation is described as the example of the gradation collapse. However, the present invention can be applied to other cases such as black saturation or intermediate gradation collapse.

In addition, the embodiments are described in detail to facilitate the description of the present invention and are not limited to embodiments in which all of the described configurations are included.

In addition, a part of the configurations of the certain embodiment can be replaced by the configurations of another embodiment or the configurations of another embodiment can be added to the configurations of the certain embodiment.

The present invention can be applied to an imaging apparatus or a PC application and an image processing apparatus connected to the imaging apparatus to be used for public welfare, monitoring, vehicle installation, and work.

What is claimed is:

1. An imaging apparatus comprising:
   an imaging unit;
   an image signal correcting unit that executes a signal level correction process on an image signal output by the imaging unit and outputs a level corrected image signal; and
   a gradation collapse suppression control unit that evaluates a degree of gradation collapse of a predetermined brightness range in the image signal output by the imaging unit and switches control of an exposure amount of the imaging unit and an input/output characteristic of the signal level correction process of the image signal correcting unit, when the gradation collapse suppression control unit determines that the gradation collapse exists according to an evaluation result and when the gradation collapse suppression control unit determines that the gradation collapse does not exist according to the evaluation result.

2. The imaging apparatus according to claim 1, wherein the gradation collapse suppression control unit controls the exposure amount of the imaging unit to increase/decrease a predetermined exposure correction amount to suppress the gradation collapse as compared with a case in which the gradation collapse suppression control unit evaluates that the gradation collapse does not exist, as gradation collapse suppression priority control when the gradation collapse suppression control unit evaluates that the gradation collapse exists.

3. The imaging apparatus according to claim 2, wherein the gradation collapse suppression control unit controls the input/output characteristic of the signal level correction process of the image signal correcting unit to increase a degree of level correction as compared with the case in which the gradation collapse suppression control unit evaluates that the gradation collapse does not exist, as the gradation collapse suppression priority control when the gradation collapse suppression control unit evaluates that the gradation collapse exists.

4. The imaging apparatus according to claim 2, wherein when the gradation collapse suppression priority control is not executed, the gradation collapse suppression control unit calculates the number of pixels in the predetermined brightness range in the image signal as an evaluation value of the degree of the gradation collapse and when the number of pixels is larger than a predetermined threshold value, the gradation collapse suppression control unit determines that the gradation collapse exists and starts the gradation collapse suppression priority control.

5. The imaging apparatus according to claim 4, wherein when the gradation collapse suppression priority control is executed, the gradation collapse suppression control unit sets a brightness range obtained by correcting the predetermined brightness range according to the exposure correction amount increased/decreased by the gradation collapse suppression priority control and calculates the number of pixels in the corrected pixel range in the image signal as the evaluation value of the degree of the gradation collapse and when the number of pixels is smaller than the predetermined threshold value, the gradation collapse suppression control unit determines that the gradation collapse does not exist and ends the gradation collapse suppression priority control.

6. The imaging apparatus according to claim 4, wherein the gradation collapse suppression control unit combines evaluation values of the degree of the gradation collapse calculated in a predetermined period and determines whether the gradation collapse exists, using the combination of the evaluation values.

7. The imaging apparatus according to claim 6, wherein the gradation collapse suppression control unit uses a different method of determining whether the gradation collapse exists, in each of the case in which the gradation collapse suppression priority control starts and the case in which the gradation collapse suppression priority control ends.

8. The imaging apparatus according to claim 2, wherein when the gradation collapse suppression priority control is executed, the gradation collapse suppression control unit evaluates a degree of gradation collapse of a second predetermined brightness range and controls the exposure correction amount increased/decreased by the gradation collapse suppression priority control according to the evaluation result.

9. The imaging apparatus according to claim 4, wherein when the gradation collapse suppression priority control starts, the gradation collapse suppression control unit estimates a degree of gradation collapse of a second predetermined brightness range in the case in which the gradation collapse suppression priority control is executed and controls the exposure correction amount increased/decreased by the gradation collapse suppression priority control according to the estimation.

* * * * *